(12) United States Patent
Takahashi

(10) Patent No.: US 6,760,739 B2
(45) Date of Patent: Jul. 6, 2004

(54) PIPELINED DIGITAL RANDOMIZER BASED ON PERMUTATION AND SUBSTITUTION USING DATA SAMPLING WITH VARIABLE FREQUENCY AND NON-COHERENT CLOCK SOURCES

(75) Inventor: Richard J. Takahashi, Phoenix, AZ (US)

(73) Assignee: Corrent Corporation, Tempe, AZ (US)

( * ) Notice: Subject to any disclaimer, the term of this patent is extended or adjusted under 35 U.S.C. 154(b) by 601 days.

(21) Appl. No.: 09/796,913

(22) Filed: Mar. 1, 2001

(65) Prior Publication Data

US 2002/0124033 A1 Sep. 5, 2002

(51) Int. Cl.[7] ................................................. G06F 1/02
(52) U.S. Cl. ......................................................... 708/250
(58) Field of Search .................................. 708/250–256

(56) References Cited

U.S. PATENT DOCUMENTS

| | | | |
|---|---|---|---|
| 3,364,308 A | 1/1968 | Vasseur | |
| 4,810,975 A | 3/1989 | Dias | |
| 4,905,176 A | 2/1990 | Schulz | |
| 5,297,207 A | * 3/1994 | Degele | ................ 380/46 |
| 5,420,928 A | 5/1995 | Aiello et al. | |
| 5,515,307 A | 5/1996 | Aiello et al. | |
| 5,570,307 A | 10/1996 | Takahashi | |
| 5,615,263 A | 3/1997 | Takahashi | |
| 5,724,277 A | 3/1998 | Nakagawa | |
| 5,737,252 A | * 4/1998 | Hollmann et al. | .......... 708/254 |
| 5,963,104 A | 10/1999 | Buer | |

FOREIGN PATENT DOCUMENTS

| | | |
|---|---|---|
| EP | 0 782 069 A1 | 7/1997 |
| FR | 2 796 477 | 1/2001 |

* cited by examiner

*Primary Examiner*—David H. Malzahn
(74) *Attorney, Agent, or Firm*—Robert D. Atkins; Quarles & Brady Streich Lang LLP

(57) ABSTRACT

A system and method for generating an indeterminate random digital data string based on a sampling source, which varies in frequency and phase, sampling an entropy source that also varies in frequency and phase, and additionally based on the principles of permutation and substitution. The system includes a random number generation circuit and a data substitution circuit coupled to receive random data output from the random number generation circuit. A data permutation circuit is coupled to receive substituted random data output from the data substitution circuit. A data compression circuit is coupled to receive permuted and substituted random data output from the permutation circuit and output at least a portion of the indeterminate random data string. A plurality of variable frequency clocks, each operating at different clock frequencies, are selectively coupled to various of the circuits within the system.

79 Claims, 9 Drawing Sheets

US 6,760,739 B2

PIPELINED DIGITAL RANDOMIZER BASED ON PERMUTATION AND SUBSTITUTION USING DATA SAMPLING WITH VARIABLE FREQUENCY AND NON-COHERENT CLOCK SOURCES

BACKGROUND

1. Field of the Invention

The present invention relates to a system and method for generating a random digital data string. More particularly, the present invention relates to a system and method for generating a random digital data string based on a sampling source, which varies in frequency and phase, sampling an entropy source that also varies in frequency and phase, and additionally based on the principles of permutation and substitution.

2. Description of Related Art

Historically, randomizer circuits have been analog-based designs. Generally, such analog-based randomizer circuits include, for example, either a noisy diode, an operational amplifier in a specific feedback configuration, or some thermal noise source to provide a random signal. Unfortunately, such devices cannot be manufactured with sufficient precision, and thus do not allow for consistent circuit production.

Digital randomizer circuits were developed, at least in part, in response to the weaknesses of analog-based randomizer circuit designs. One such circuit, disclosed in U.S. Pat. No. 5,570,307, and having the same inventor as the instant application, is based on the metastable operability of flip-flops. Specifically, the design consists of a plurality of flip-flops that are forced to operate in a metastable state. The random, unpredictable nature of flip-flops operated in the metastable state being the primary source of random data blocks. More specifically, each flip-flop is coupled to a dedicated free-running oscillator that operates at a prime-number-based frequency. Each flip-flop also receives a common jitter clock signal, and therefore operates in a metastable state by intentionally violating either the flip-flop set-up or hold time margins of incoming data relative to the jitter clock, thus generating a random noise sequence. To further increase the entropy of the system, the flip-flop outputs are exclusively-ORed (XORed).

The above-described digital randomizer suffers various weakness. Namely, the oscillator frequencies can drift toward, and actually lock on to, one another. Additionally, as the size of the circuitry that makes up the randomizer decreases, the likelihood of sustaining, or even reaching a metastable state, significantly decreases. Thus, this prior design is not sufficiently robust.

Hence, there is a need in the art for a digital randomizer circuit that does not rely on the metastable operability of flip-flops. And more particularly, a digital randomizer that does not utilize oscillators that can lock on to each other, and that is sufficiently robust as circuit size decreases.

SUMMARY OF THE INVENTION

The present invention relates to a system and method for generating a random digital data string based on a sampling source, which varies in frequency and phase, sampling an entropy source that also varies in frequency and phase, and additionally based on the principles of permutation and substitution.

In one aspect of the present invention, the system includes a random number generation circuit and a data substitution circuit coupled to receive random data output from the random number generation circuit. A data permutation circuit is coupled to receive substituted random data output from the data substitution circuit. A data compression circuit is coupled to receive permuted and substituted random data output from the permutation circuit and output at least a portion of the indeterminate random data string. A plurality of variable frequency clocks, each operating at different clock frequencies, are selectively coupled to various of the circuits within the system.

In another aspect of the present invention, the method includes the steps of generating a first random number of a first predetermined bit length, and substituting the first random number with different data based upon the first random number. The substituted random data is then permuted. Thereafter, the permuted and substituted random data is compressed to form at least a portion of the indeterminate random data string.

DETAILED DESCRIPTION OF THE INVENTION

Figure 1:
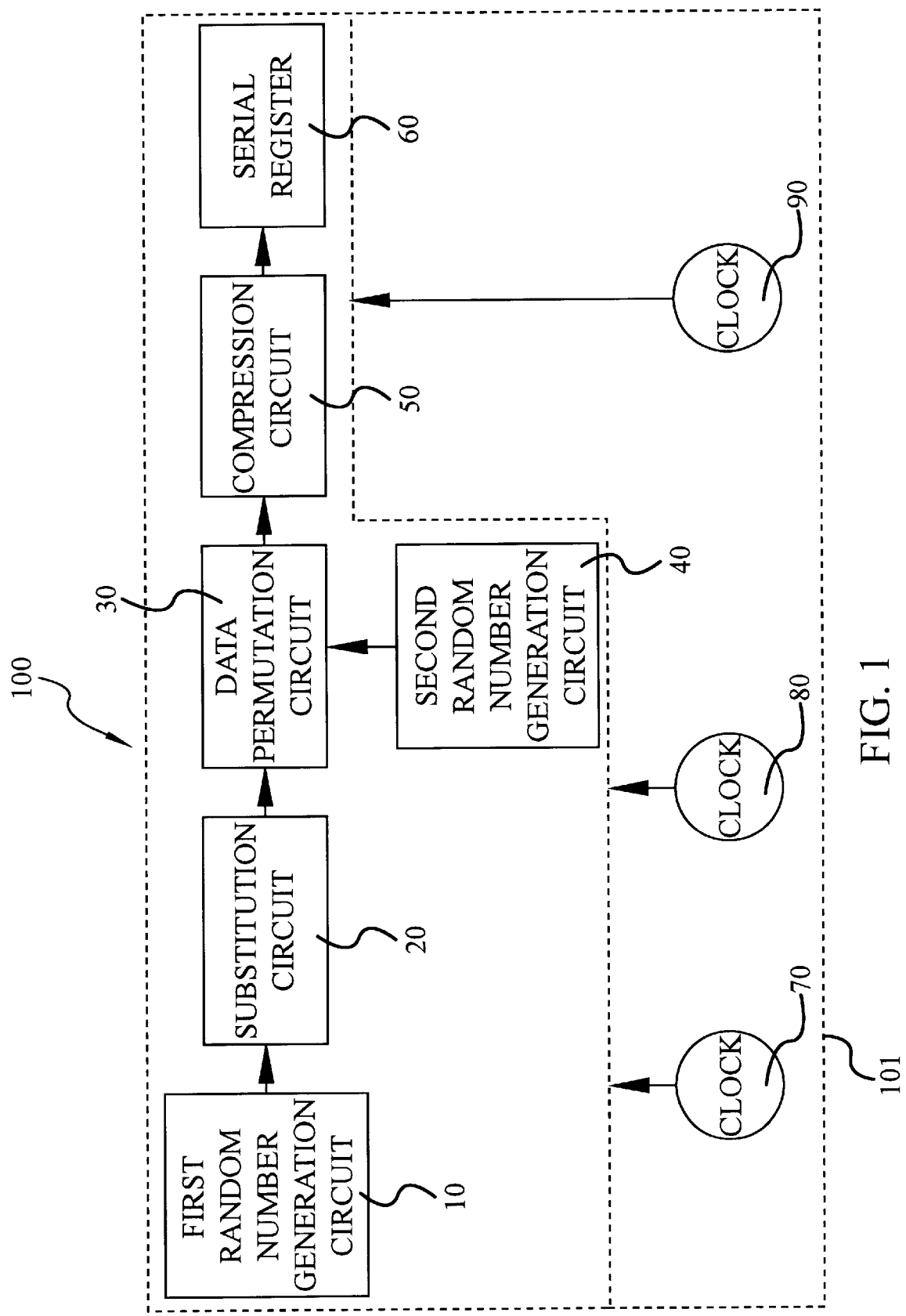
FIG. 1 is a system level block diagram of a digital randomizer circuit, according to an embodiment of the present invention.

An overall block diagram of the architecture of a system used to generate indeterminate, random data is depicted in FIG. 1. As indicated therein, the system 100 includes a first random number generation circuit 10, which generates random data of a predetermined bit length. In the preferred embodiment, the predetermined bit length is 48 bits; however, it will be appreciated that other bit lengths may be chosen. A data substitution circuit 20, coupled to the output of the random number generation circuit 10, substitutes the random data output from the random number generation circuit 10 with different data. As will be discussed more fully below, the substitutions that are made in the data substitution circuit 20 are based upon the random data itself. A data permutation circuit 30 then receives the substituted random data from the substitution circuit 20 and, based on address information received from a second random number generation circuit 40, permutes the substituted random data received from the substitution circuit 20. The permuted and substituted random data is then coupled to a compression circuit 50, in which the data is compressed into a single bit and is coupled to one or more serial registers 60 of a predetermined bit length. After a predetermined number of clock cycles the one or more serial registers 60 are full and are ready for additional processing and use.

Operation of the system 100 is controlled by up to three individual, non-coherent clock sources 70, 80, 90. These clock sources each operate at a different frequency and phase from one another, and each varies in frequency around a different central frequency. The central frequency of each clock source is based on prime numbers and odd divisors thereof. Moreover, the central frequency of the first clock source 70 is greater than that of the second clock source 80, and the central frequency of the second clock source 80 is greater than that of the third clock source 90. Preferably, though not necessary for proper system operation, the overall frequency shift of each clock source is ±30% of its central frequency. The shift need not be in a purely random fashion, it need only occur during clock source operation. Using multiple non-coherent, variable frequency clock sources with prime number-based central frequencies maximizes system entropy and ensures that the individual clock sources do not lock onto each other nor onto other clock sources of systems into which the randomizer system 100 may be installed.

Figure 2:
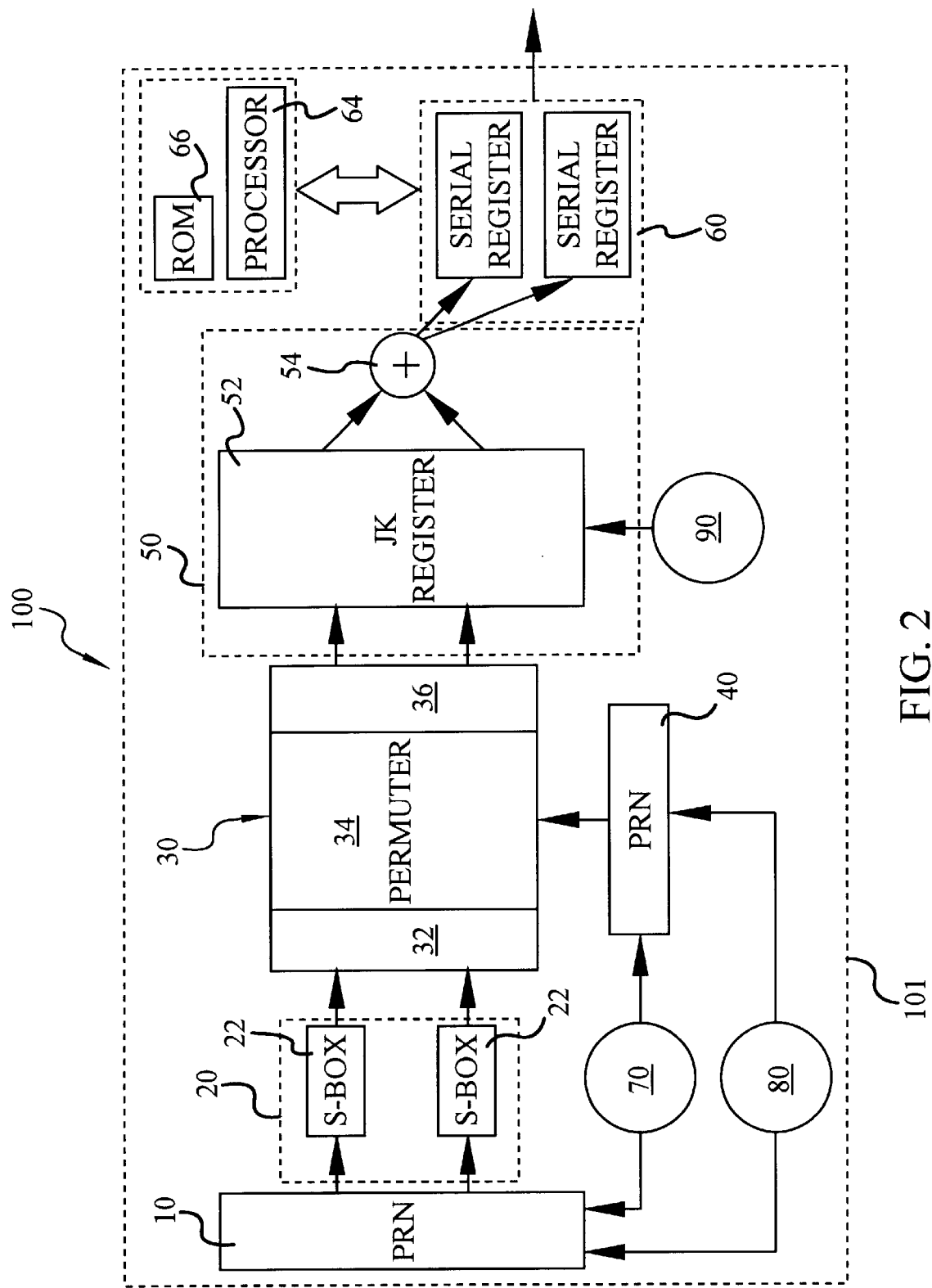
FIG. 2 is a detailed block diagram of a preferred embodiment of the digital randomizer circuit, according to the present invention.
Figure 3:
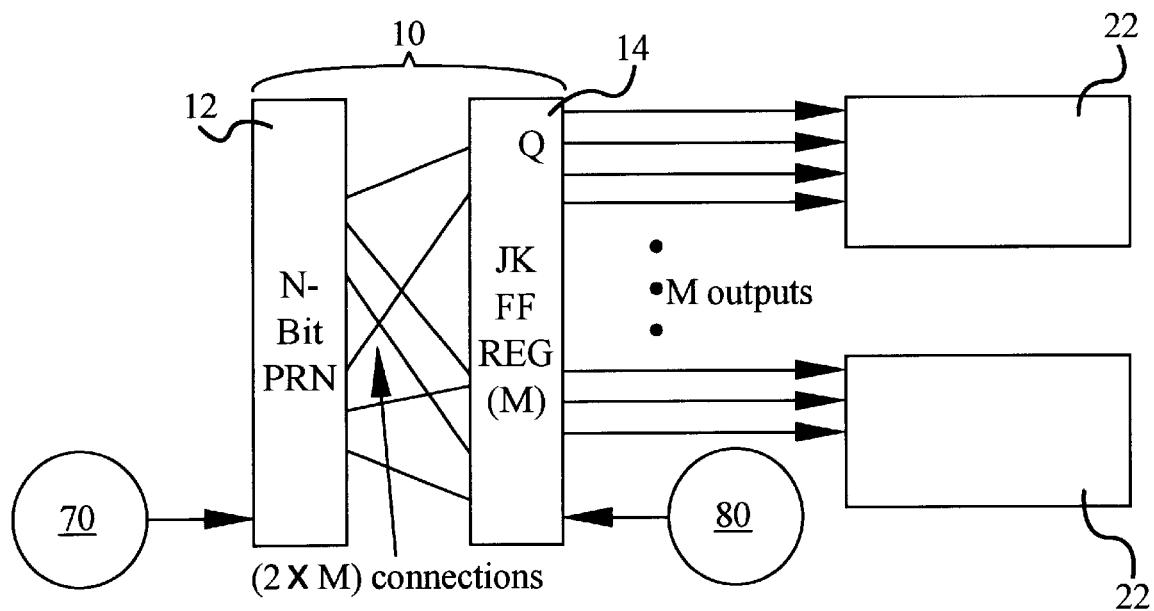
FIG. 3 is a block diagram of a preferred embodiment of a first random number generation circuit used in the embodiment depicted in FIG. 2.

Turning now to the subsequent figures, a more detailed description of a particular preferred embodiment of the present invention will be provided. With reference first to FIG. 2, it can be seen that a so-called "cryptographic boundary" 101 encompasses the entire randomizer system 100. Within the cryptographic boundary 101, as stated previously, random data of a predetermined bit length is initially generated by the first random number generation circuit 10. In a preferred embodiment, this predetermined bit length is 48 bits; however, as alluded to above, it will be appreciated that other bit lengths may be chosen. This random data that is generated by the random number generation circuit 10 is realized by sampling an N-bit pseudo random number generator (PRN) using a JK-type flip-flop register. More particularly, and with reference now to FIG. 3, the first random number generation circuit 10 includes an N-bit, free-running PRN 12. The PRN 12 uses a standard polynomial feedback configuration, as is known in the art, but may be any device known in the art for generating N-bit pseudo random numbers. The PRN 12 is connected to a JK flip-flop register 14 that, to provide additional entropy to the overall system output, samples less than the N-bits generated by the PRN 12. In the preferred embodiment, the PRN 12 is a 128-bit PRN, and 96 bits are sampled by the JK flip-flop register 14.

Figure 4:
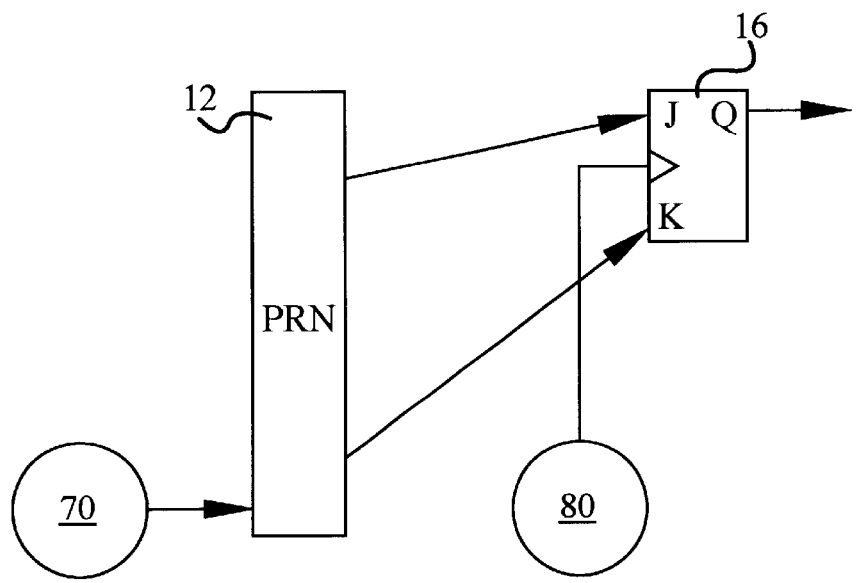
FIG. 4 is a block diagram depicting connection restraints within the random number generation circuit of FIG. 3.

The JK flip-flop register 14 includes at least M-number of individual JK-type flip-flops 16 (see FIG. 4). In the preferred embodiment, in which 96 bits are sampled from the PRN 12, the JK flip-flop register 14 includes at least 48 individual JK flip-flops 16, though it will be appreciated that the JK flip-flop register 14 may contain any number of individual JK flip-flops 16 above this minimum number. The preferred embodiment includes this minimum number because each JK flip-flop 16 includes two data inputs (a "J" input and a "K" input), as is well-known, each of which is connected to receive one bit output by the PRN 12. Thus, since only 96 of the 128 bits generated by the PRN 12 are being used in the preferred embodiment, 48 JK flip-flops 16 are concomitantly used. It will be appreciated that the present invention encompasses different numbers of bits being sampled by the JK flip-flop register 14, and that the minimum number of individual JK flip-flops 16 may be chosen to reflect the number of bits being sampled.

In any case, to further increase the entropy of the first random number generation circuit 10 and the overall system 100, the interconnection of the PRN 12 and the JK flip-flop register 14 is preferably permuted. In other words, the (2×M)-interconnections between the PRN 12 and the M-number of individual JK flip-flops 16 is restricted such that no adjacent bits output by the PRN 12 are connected to the same JK flip-flop 16. This non-adjacent connection schema is illustrated generally in FIG. 3, and more particularly in FIG. 4. It will be appreciated that this connection restraint is preferable, since it increases system entropy, but is not necessary for system operation. Thus, the present invention is not limited to this connection restraint.

Each of the JK flip-flops 16 also includes two data outputs (a "Q" output and a "Q-bar" output). However, only one output per JK flip-flop 16 is used. Hence, although the JK flip-flop register 14 samples (2×M)-number of the bits output by PRN 12 (e.g., 96 bits), the JK flip-flop register 14, and thus the first random number generation circuit 10, only outputs M-bits (e.g., 48 bits). The skilled artisan will appreciate that either output, "Q" or "Q-bar," may be selected, so long as the selection is consistent for each of the individual flip-flops 16.

The PRN 12 includes a clock input for operating the PRN 12 at a specified frequency, as is well-known. Additionally, as is well-known, each JK flip-flop 16 includes a clock input. In this regard, the first clock source 70 is coupled to the PRN 12 clock input, and the second clock source 80 is coupled to each of the M-number of JK flip-flop 16 clock inputs. As noted above, the first 70 and second 80 clock sources each vary in frequency and phase around a different central frequency. In the preferred embodiment, the central frequency of the first clock source 70 is 91 MHz and the central frequency of the second clock source 80 is 10.1 MHz, or one-ninth that of the first clock 70. It will be appreciated that other prime-number-based frequencies may be selected; however, the ratio of the frequencies of the first 70 and second 80 clock sources should be an odd multiple. The first 70 and second 80 clock sources may be one of many known devices that vary in frequency and phase. By way of non-limiting example, an astable phase-lock-loop (PLL) clock circuit, or an astable rate multiplier counter circuit could be used.

With the above-described configuration of the first random number generation circuit 10, wherein a sampling source (e.g., the JK flip-flop register 14) that operates at a variable frequency and phase is used to sample an entropy source (e.g., the PRN 12) that also operates at a variable frequency and phase, the entropy of the first random number generation circuit 10 increases; thus, a truer random data source for the remainder of the system 100 is provided.

The first random number generation circuit 10 is coupled to the substitution circuit 20. As shown more particularly in FIGS. 2 and 3, the substitution circuit 20 preferably includes a plurality of so-called substitution boxes, or S-boxes 22. As is known in the art, S-box design is based on the principles of confusion and diffusion and, more particularly, provides discontinuous data outputs by replacing input data, or a segment of input data, with specified data values, based on the input data itself. In the present system 100, the random M-number of bits output from the first random number generation circuit 10 form random addresses into the S-boxes 22.

Specifically, the S-boxes 22 are arranged as two n×n arrays, which, in the preferred embodiment (e.g., where M=48), means each is arranged as a 24×24 array. These n×n arrays are realized in either a read-only-memory (ROM) or random logic circuit configuration. Thus, in the preferred embodiment, one half of the random 48 bits output by the first random number generation circuit 10 form addresses into one of the S-boxes 22, and the other half of the random bits form addresses into the other S-box 22. The output of each S-box 22 is another 24 bit random data segment. The 24 bit random data segments output from each S-box 22 are concatenated to form 48 bits of substituted random data. It should be noted that the substitution circuit 20 may be formed using any cryptographically sound S-box design, that is generated from any one of the numerous "one-for-one" substitution algorithms known in the art. However, the preferred embodiment utilizes the Data Encryption Standard (DES) Sbox values arranged in these 24×24 arrays, due to the robust characteristics of the DES design.

Figure 5:
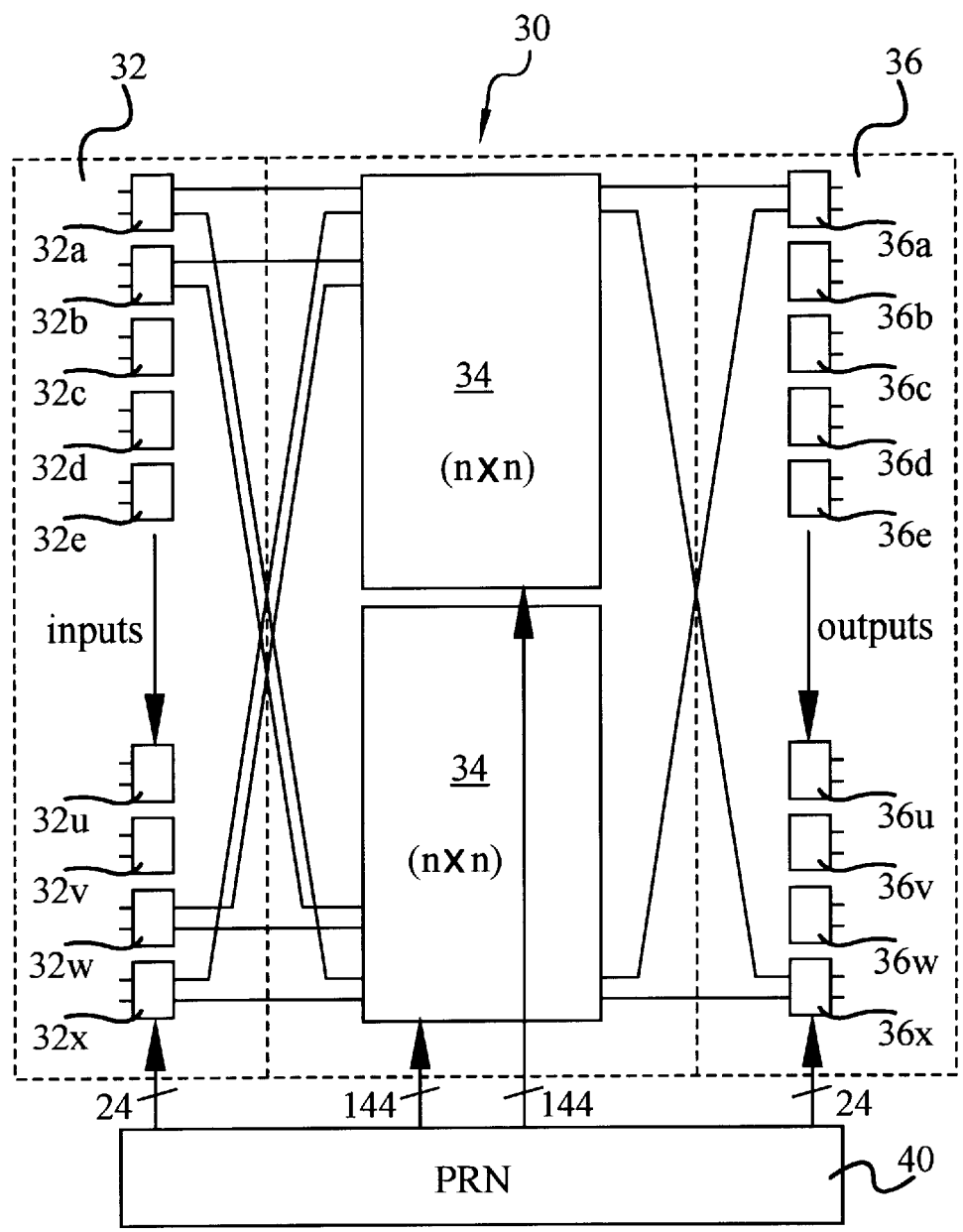
FIG. 5 is a block diagram of a preferred embodiment of a data permutation circuit used in the embodiment depicted in FIG. 2.

The output of the substitution circuit 20 is coupled to the data permutation circuit 30. As shown more particularly in FIGS. 2 and 5, the data permutation circuit 30 includes an input "cross bar" switch 32, a plurality of permuter switching networks 34, and an output cross bar switch 36. As will be described in more detail below, the data permutation circuit 30 receives the substituted random data from the substitution circuit 20, and randomly permutes this data based on random address data received from the second random number generation circuit 40.

Figure 6:
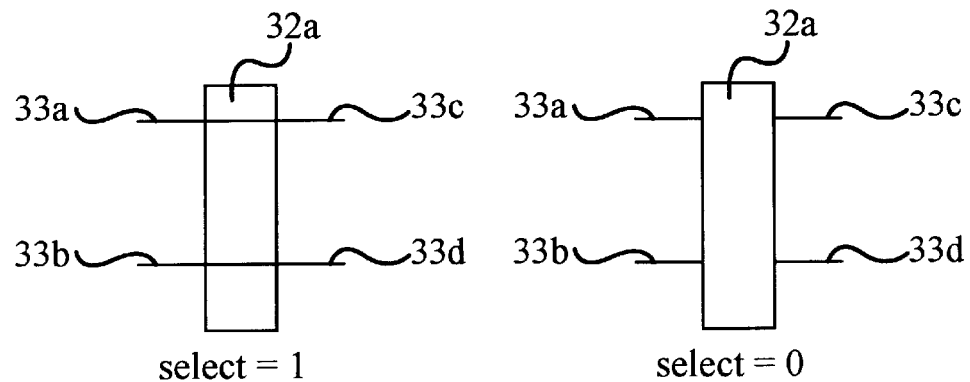
FIG. 6 is a functional diagram depicting the functionality of cross bar switch elements incorporated into the data permutation circuit of FIG. 5.

The cross bar switches 32, 36 each comprise a plurality of individual dual-input/dual-output data switch elements (e.g., 32a, 32b, 32c, . . ., 36a, 36b, 36c, . . . ), each of which include an individual address select line. Thus, in the preferred embodiment, in which 48 bits of data are output from the substitution circuit 20, the cross bar switches 32, 36 will comprise 24 of these individual data switch elements (e.g. 32a–32x, 36a–36x) each having its individual address select line coupled to individual outputs of the second random number generation circuit 40. Of course, the skilled artisan will appreciate that the number of individual switch elements that comprise the cross bar switches 32, 36 will depend on the number of data bits being supplied by the substitution circuit 20. As depicted in FIG. 6, each of these individual switch elements, when addressed via its individual address select line, transfers the data that is on each of its input lines 33a, 33b directly to each of its output lines 33c, 33d. Conversely, when the switch is not addressed, the data on each of its output lines 33c, 33d remains static. For example, if the data on the two inputs 33a, 33b of switch 32a are a logic "1" and a logic "0," respectively, and switch 32a is selected (e.g., by placing a binary logic "1" on its address select line), then the data on the two outputs 33c, 33d of switch 32a will likewise be a logic "1" and a logic "0," respectively. Then, if switch 32a is subsequently de-selected (e.g., by placing a binary logic "0" on its address select line), then the data on the two outputs 33c, 33d of switch 32a will remain a logic "1" and a logic "0," respectively.

Figure 8:
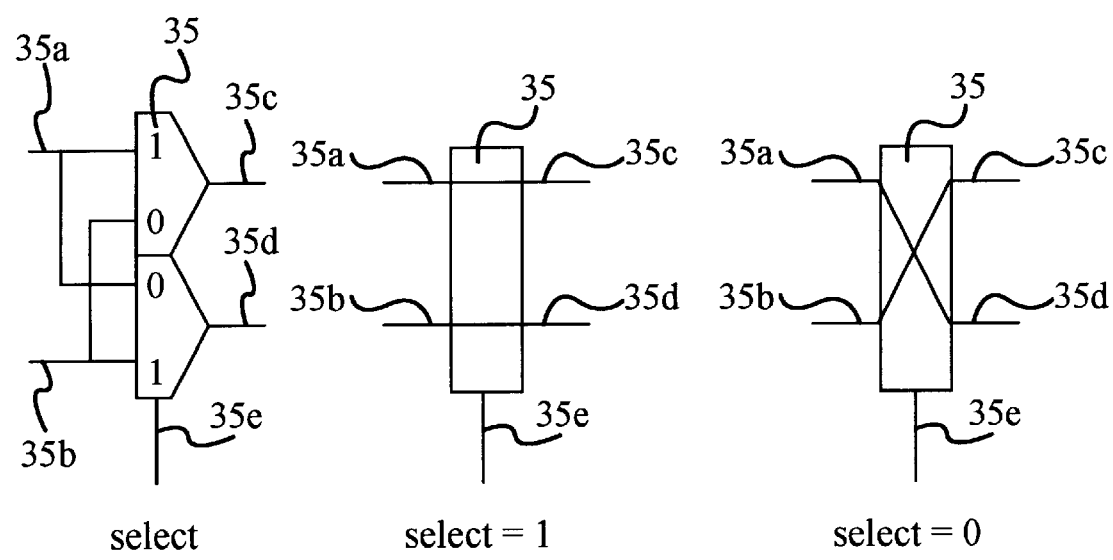
FIG. 8 is a functional diagram depicting the functionality of individual permuter elements that comprise the Benes network depicted in FIG. 7.
Figure 7:
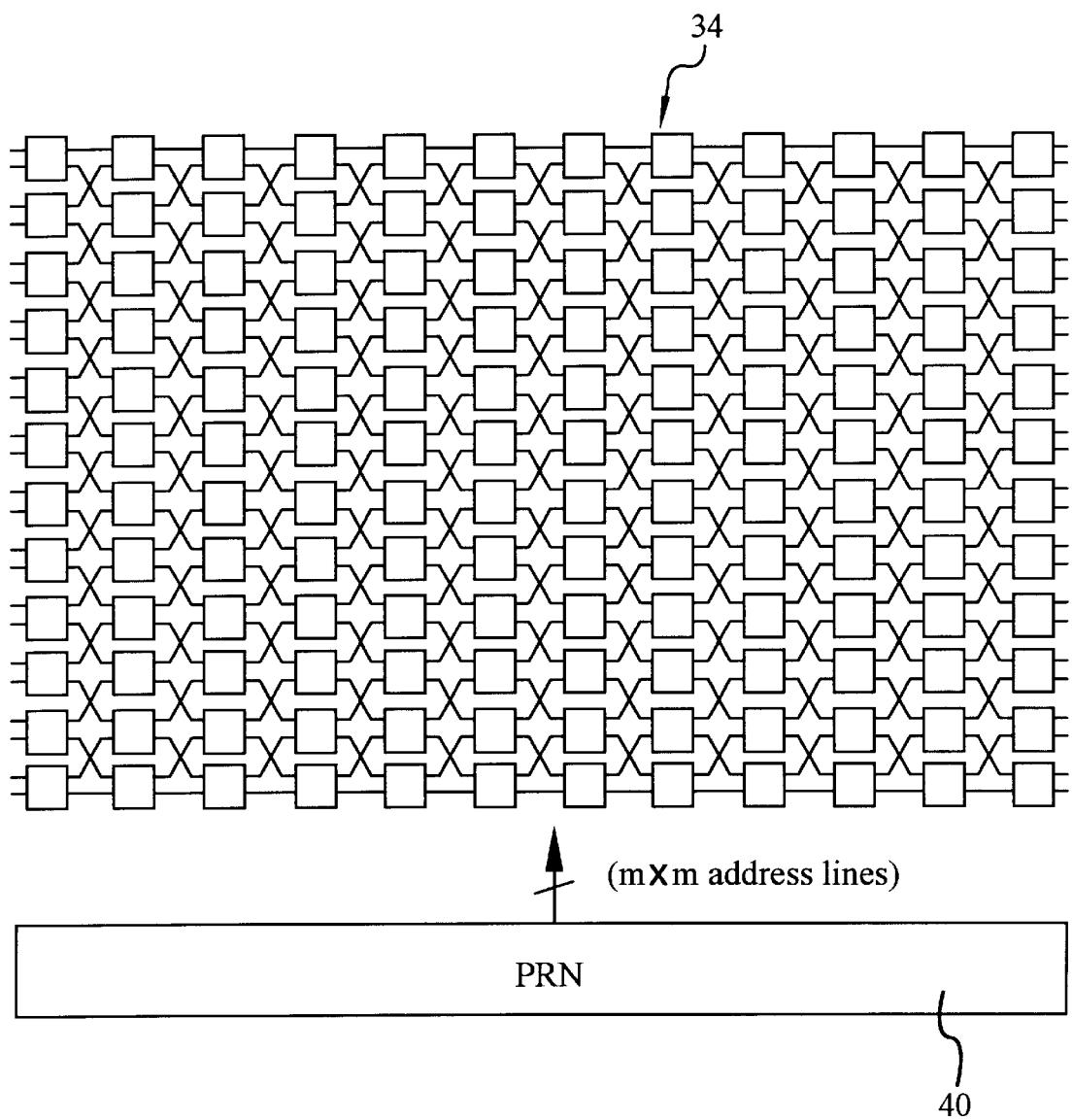
FIG. 7 is a block diagram of a Benes-type switching network employed in a preferred embodiment of the data permutation circuit of FIG. 5.

In the preferred embodiment, each of the plurality of permuter switching networks 34 comprises a Benes-type non-blocking switching network. As is known in the art, a Benes network functions such that any input can be connected to any output in only one path and with no redundant connections. More particularly, and as depicted more explicitly in FIG. 7, each permuter switching network 34 comprises an m×m array of individual permuter elements 35. Thus, in the preferred embodiment in which 48 bits of data are output from the substitution circuit 20, each permuter switching network 34 comprises a 12×12 array. Each permuter element 35, depicted functionally in FIG. 8, is a switching device having two inputs 35a, 35b that may be connected to either of its two outputs 35c, 35d, depending upon the logic value on its individual select line 35e. Since, each permuter element 35 includes two inputs and two outputs, the particular Benes networks 34 employed in the preferred embodiment of the present invention are colloquially referred to as n×n Benes networks, where n=2×m. As indicated in FIG. 7, each network 34 comprises m×m individual select lines 35e (one for each permuter element 35), each of which is connected to individual outputs of the second random number generation circuit 40. Thus, in the preferred embodiment, the Benes networks 34 are each 24×24 Benes networks 34, with 144 individual select lines 35e.

Figure 9:
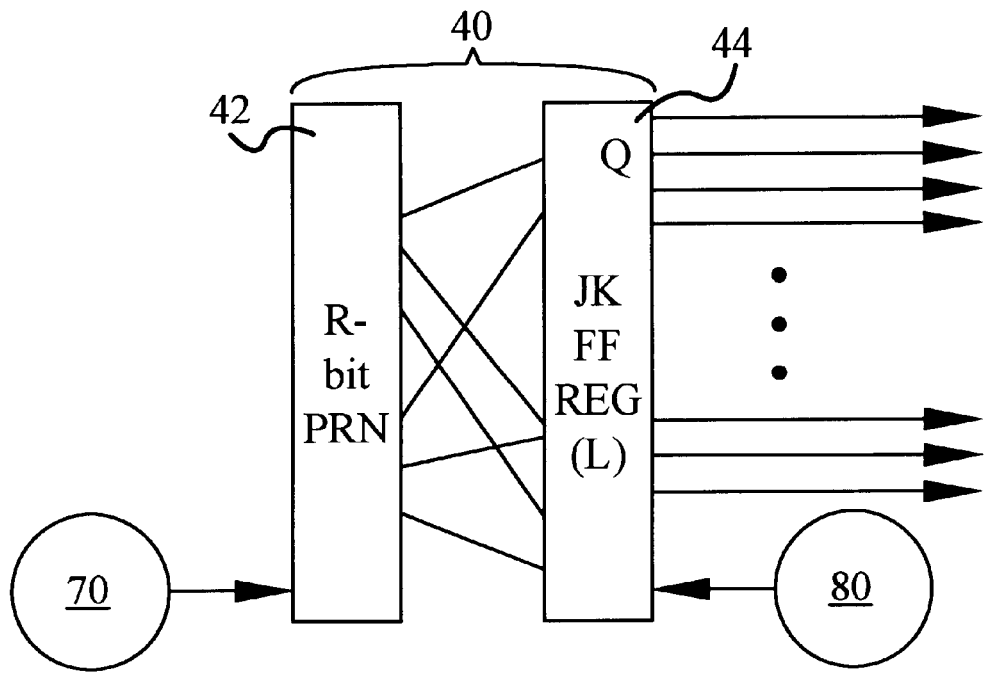
FIG. 9 is a block diagram of a preferred embodiment of a second random number generation circuit used in the embodiment depicted in FIG. 2.

The second random number generation circuit 40 is designed substantially similar to the first random number generation circuit 10. Specifically, as depicted more particularly in FIG. 9, the second random number generation circuit 40 comprises a second PRN 42 and a second JK flip-flop register 44. The second PRN 42 is, however, an R-bit, free-running PRN, sampled by a second JK flip-flop register 44 that includes L-number of individual JK flip-flops 16. In the preferred embodiment, which includes two cross bar switches 32, 36, each having 24 individual switch elements, and two 24×24 Benes networks, 336 of the R-bits output by the second PRN 42 are sampled by the second JK flip-flop register 44. Thus, the second JK flip-flop register 44 includes, as a minimum, 168 individual JK flip-flops. These specific differences between the first 10 and second 20 random number generation circuits are based, at least in part, on the fact that individual output lines of the second random number generation circuit 40 are each connected to the individual address select lines in each of the cross bar switches 32, 36, and each of the Benes networks 34, for a total of 336 connections. There is a connection restraint between the second PRN 42 and the second JK flip-flop register 44, which is the same restraint as between the first PRN 12 and first JK flip-flop register 14. That is, no adjacent bits are connected to the same individual JK flip-flop 16. Additionally, as with the first random number generation circuit 10, the first clock source 70 is coupled to the PRN 42 clock input, and the second clock source 80 is coupled to each of the L-number of JK flip-flop clock inputs in the second JK flip-flop register 44. Thus, the same entropy maximizing effect is accorded the second random number generation circuit 20.

Returning once more to FIG. 5, the interconnections between the cross bar switches 32, 36, the Benes networks 34, and the second random number generation circuit 40 in the preferred embodiment are more explicitly depicted. As illustrated therein, to further randomize the output from the permutation circuit 30, each input cross bar switch 32 has an output line connected to each of the individual Benes networks 34, and likewise, each output cross bar switch 36 has an input line connected to each of the individual Benes networks 34. With this preferred embodiment, the input 32 and output 36 cross bar switches and the plurality of permuter switching networks 34 form a 48×48 permuter, which provides 48! (factorial) paths, using the 336-bit address field generated by the second random number generation circuit 40. Thus, the substituted random data received from the substitution circuit 20 is randomly permuted in the permutation circuit 30. This randomly-permuted and substituted random data is then coupled to the data compression circuit 50.

The present invention is by no means limited to the use of two 24×24 Benes networks. Indeed, a single 48×48 Benes network configuration, or any size Benes network necessary to process the number of substituted random bits provided from the substitution circuit 20, could be utilized.

The data compression circuit 50, as depicted generally in FIG. 2, includes a third JK flip-flop register 52 and a non-linear element (NLE) 54. The third JK flip-flop register 52 is clocked with the third clock source 90, which operates at a central frequency that is 1/90th that of the first clock source 70. With this configuration, the data output from the third JK flip-flop register 52 is fundamentally compressed by the NLE 54 into a single bit stream. Again, using the third clock source 90 to operate the third JK flip-flop register 52 further maximizes the entropy of the overall system 100. Of course, the skilled artisan will appreciate that, in an alternative embodiment, the third JK flip-flop register 52 and third clock source 90 could be eliminated from the system 100 altogether. In such an instance, the randomly-permuted and substituted random data output from the data permutation circuit 30 is received by the NLE 54 directly. However, the entropy of this alternative system is less than that of the preferred embodiment.

Figure 10:
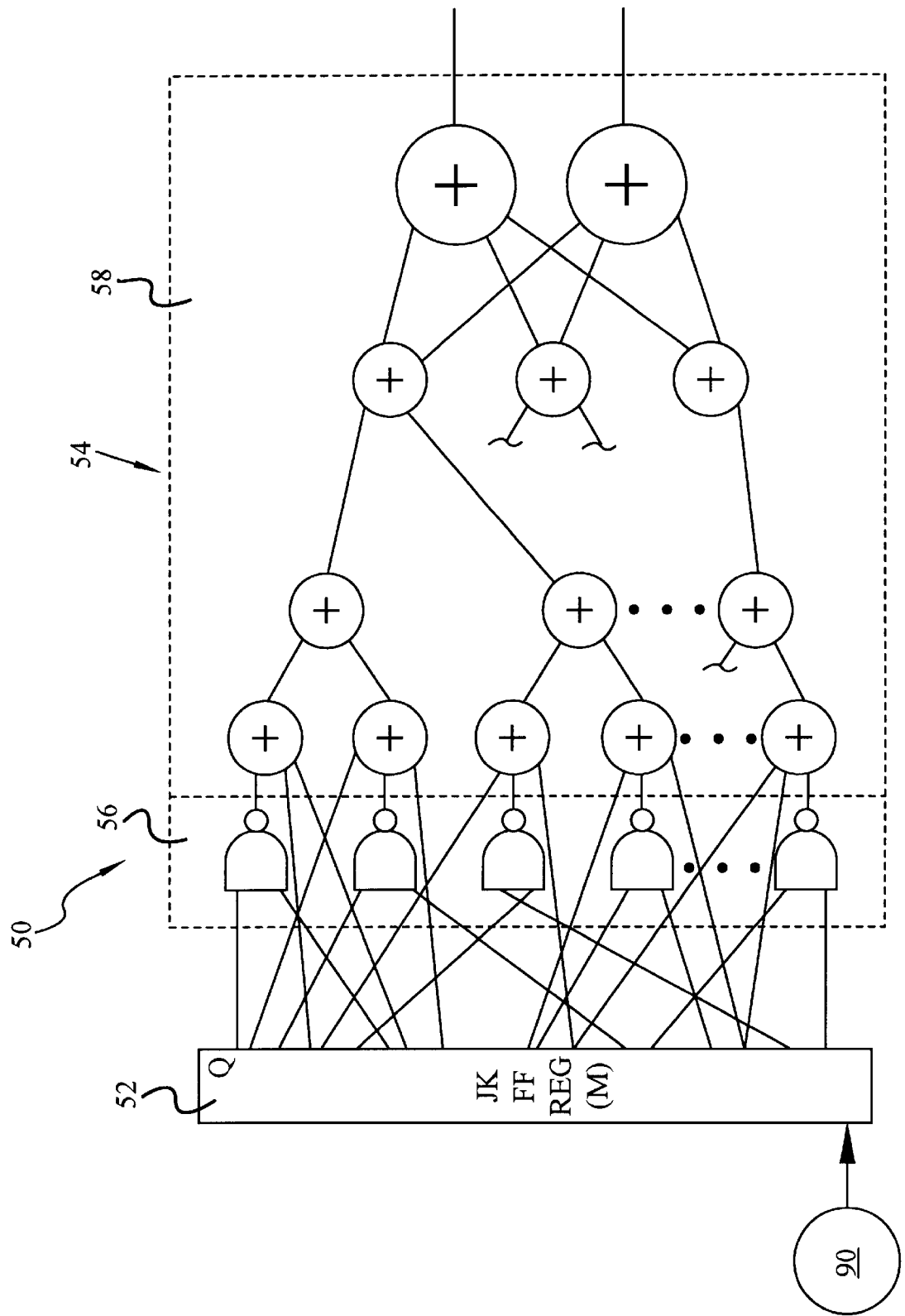
FIG. 10 is a block diagram of a preferred embodiment of a data compression circuit used in the embodiment depicted in FIG. 2.

With reference now to FIG. 10, a more detailed description of a preferred embodiment of the data compression circuit 50 will be described in more detail. As illustrated therein, the randomly-permuted and substituted random data is received from the data permutation circuit 30 by the third JK flip-flop register 52. The third JK flip-flop register 52 minimally includes M-number of individual JK flip-flops 16, which in the preferred embodiment is 48. This is the minimum number since both inputs on each of the individual JK flip-flops 16 is utilized. The third clock source 90 is coupled to each of the M-number of JK flip-flop 16 clock inputs. The third clock source 90, as mentioned previously, is a variable frequency non-coherent clock source. In the preferred embodiment, the central frequency of the third clock source 90 is 1.011 MHz, or one-ninetieth that of the first clock source 70. As was true with the second clock source 80, other frequencies may be selected for the third clock source 90, so long as the ratio of the frequencies of the first 70 and third 90 clock sources is an odd multiple. Additionally, as with the other clock sources, the third clock source 90 may be one of many known devices that vary in frequency and phase, such as an astable phase-lock-loop (PLL) clock circuit, or an astable rate multiplier counter circuit could be used.

Figure 11:
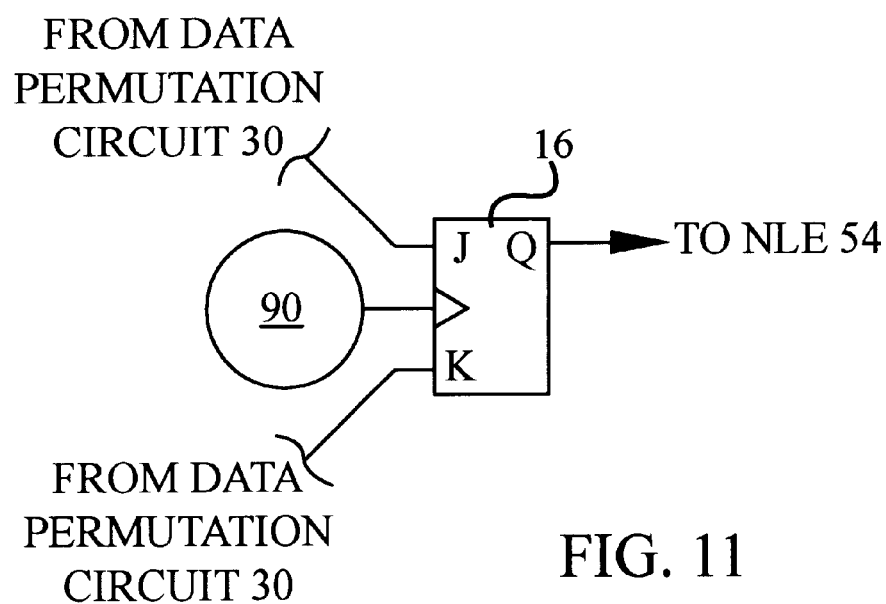
FIG. 11 is a block diagram depicting the input and output connections for a single JK flip-flop within the JK flip-flop register used in the data compression circuit of FIG. 10.

With the above-described configuration, the M-number (e.g., 48) of randomly-permuted and substituted bits received from the data permutation circuit 30 are selectively digitally mixed by each JK flip-flop 16. In other words, and as depicted more particularly in FIG. 11, each JK flip-flop 16 will receive two different bits from the data permutation circuit 30, one on the "J" input and the other on the "K" input, and will output a single bit on either the "Q" or "Q-bar" output, either of which may be selected so long as the selection is consistent for each flip-flop 16. Given that the third clock source 90 is non-coherent with the first 70 and second 80 clock sources, and hence the frequency of the data input to each JK flip-flop 16, the output of each JK flip-flop 16 in the JK flip-flop register 52 is further randomized, thus further increasing system entropy. It will be appreciated that the third JK flip-flop register 52 and, concomitantly, the third variable frequency clock source 90, while increasing system entropy, are not necessary for proper system operation. Rather, this combination is implemented as part of a preferred embodiment.

Figure 12:
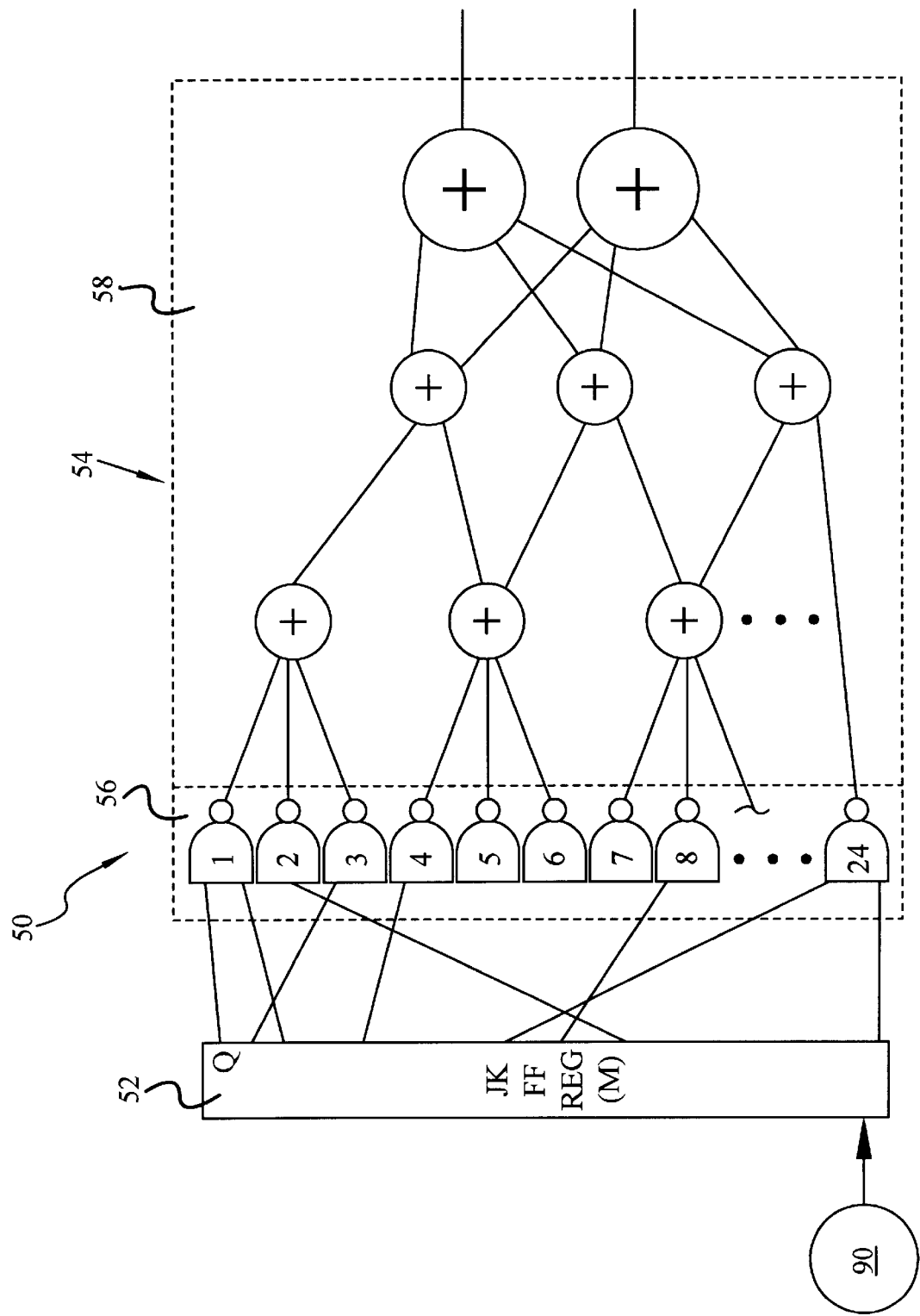
FIG. 12 is a block diagram of an alternate embodiment of a data compression circuit used in the present invention.

To even further randomize the data output from the JK flip-flop register 52, the M-number of bits output by the third JK flip-flop register 52 are arbitrarily permuted before being input to the NLE 54. In other words, the interconnections between the third JK flip-flop register 52 and the NLE 54 are made arbitrarily. Returning now to FIG. 10, in a preferred embodiment the NLE 54 comprises a plurality of input NAND gates 56 coupled to receive arbitrarily selected bits output by the JK flip-flop register 52, and having outputs selectively coupled to individual XOR gates that comprise an XOR tree 58. The number of NAND gates is selected consistent with the number of bits being output by the JK flip-flop register 52. Since, in the preferred embodiment, 48 bits are output by the JK flip-flop register 52, at least 12 NAND gates 56 will be used. It will be appreciated, however, that other numbers may be selected to be consistent with the number of bits being output by the JK flip-flop register 52. Those bits output by the third JK flip-flop register 52 that are not input to a NAND gate 56, are received by one of the XOR gates comprising the XOR tree 58. The present invention is not limited to an NLE configured as depicted in FIG. 10, indeed the skilled artisan will appreciate that numerous other NLE configurations, of which FIG. 12 is exemplary, may be used.

The final stage of the XOR tree 58 forms a dual output that provides independent data to two separate serial registers 60. Operation of the serial registers 60 is controlled by a processor 64, which is in turn controlled by software resident within a read-only-memory (ROM) 66. Specifically, read/write operations and final post-processing of the random data is controlled by the processor 64. Such post-processing includes functionality checks, such as checking the random data for weak numbers in each of the serial registers 60. For example, the data in each of the serial register 60 is checked for certain patterns, such as all zeros or all ones, or alternating ones and zeros, or numerous other patterns known in the art which might indicate a hardware failure. Based on the post-processing checks, the processor 64 will determine which data should be output by the system 100 to external systems/equipment. For instance, one of the registers may include a strong number while the other includes a weak number. In this case, the processor 64 might decide to output the strong number or might decide that combining the numbers in the two registers 60 together will produce a sufficiently strong number, and output the combination.

In addition to the functional checks described above, the data in each serial register 60 is additionally checked for repeating patterns, too many of which may indicate that the system 100 is biased. If any of these checks indicates an error, the processor 64 will check the data, up to three times, to verify the error was not transient in nature. If after the third check the error persists, the processor 64 will set a flag in an unillustrated flag register. The processor 64 additionally removes any possible bias, correlation, or DC component that may exist in the random data signal, due to second or third order effects from component fabrication processes or environmental factors. This additional post-processing is accomplished by a hashing or linear congruent sequence (LCS) technique, or other techniques known in the art, such as the Blum-Blum-Shub generator, or various NIST (National Institute of Standards and Testing) techniques.

As indicated throughout the present description, it will be appreciated that the present invention is not limited to the generation of 128 bits of random, indeterminate data, nor are each of the circuits described herein limited to the generation and/or use of 48 bits, or 24 bits, or any specified multiple thereof. Rather, the present invention encompasses myriad numbers of bits of random, indeterminate data and the generation and/or use of myriad numbers of bits to provide the random, indeterminate data.

It will further be appreciated that the present invention may be used as either a stand-alone system, or may be incorporated as part of another system. Additionally, the system architecture disclosed herein is independent of the specific technology used to implement the various circuits that comprise the system, all of which may be found in standard cell libraries.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A system for generating an indeterminate random data string, comprising:
   a first random number generation circuit;
   a data substitution circuit coupled to receive random data output from said random number generation circuit, wherein the data substitution circuit uses the random data output as addresses to generate first and second random data segments which are concatenated to form substituted random data output;
   a data permutation circuit coupled to receive the substituted random data output from said data substitution circuit and providing permuted data output; and
   a data compression circuit coupled to receive the permuted data output from said permutation circuit and output at least a portion of the indeterminate random data string having reduced data length as compared to the permuted data output.

2. A system for generating an indeterminate random data string, comprising:
   a first random number generation circuit;
   a data substitution circuit coupled to receive, random data output from said random number generation circuit;
   a data permutation circuit coupled to receive substituted random data output from said data substitution circuit;
   a data compression circuit coupled to receive the permuted and substituted random data output from said permutation circuit and output at least a portion of the indeterminate random data string; and
   a plurality of variable frequency clocks, each operating at different clock frequencies, selectively coupled to at least said random number generation circuit, said data substitution circuit, said data permutation circuit, and said data compression circuit.

3. The system of claim 2, wherein Said plurality of variable frequency clocks includes at least a first, a second, and a third variable frequency clock, operating at a first variable frequency magnitude, a second variable frequency magnitude, and a third variable frequency magnitude, respectively.

4. The system of claim 3, wherein the first variable frequency magnitude is an odd multiple of the second variable frequency magnitude and a different odd multiple of the third variable frequency magnitude.

5. The system of claim 3, wherein the first variable frequency magnitude is greater than the second variable frequency magnitude, and the second variable frequency magnitude is greater than the third variable frequency magnitude.

6. The system of claim 3, wherein the first variable frequency magnitude is a prime number.

7. The system of claim 6, wherein the prime number is greater than 80 MHz.

8. The system of claim 2, wherein each of said plurality of variable frequency clocks comprise unstable phase-lock-loop (PLL) clock circuits, which vary in frequency and phase during operation.

9. The system of claim 2, wherein each of said plurality of variable frequency clocks comprises a rate multiplier counter circuit, which vary in frequency and phase during operation.

10. The system of claim 2, wherein said first random number generation circuit comprises:
    an N-bit pseudo random number generator circuit; and
    M number of JK-type flip-flops each coupled to receive two of the N-bits output by said N-bit pseudo random number generator circuit.

11. The system of claim 10, further comprising:
    a first variable frequency clock, coupled to a clock input port of said N-bit pseudo random number generator circuit, causing said N-bit pseudo random number generator circuit to operate at a first variable frequency magnitude; and
    a second variable frequency clock, coupled to a clock input of each of said JK flip-flops, causing each of said JK flip-flops to operate at a second variable frequency magnitude.

12. The system of claim 11, wherein the first variable frequency magnitude is an odd multiple of the second variable frequency magnitude.

13. The system of claim 12, wherein the first variable frequency magnitude is approximately nine times the second variable frequency magnitude.

14. The system of claim 12, wherein the first variable frequency magnitude is a prime number.

15. The system of claim 14, wherein the prime number is greater than 80 MHz.

16. The system of claim 10, wherein M and N are both integers, and M is less than N/2.

17. The system of claim 10, wherein M is equal to 48 and N is equal to 128.

18. The system of claim 10, wherein the two bits coupled to each of said JK flip-flops are non-adjacent bits.

19. The system of claim 2, wherein the data substitution circuit comprises a plurality of substitution boxes (S-boxes).

20. The system of claim 19, wherein each of said plurality of S-boxes is based on Data Encryption Standard (DES) S-boxes.

21. The system of claim 19, wherein each of said plurality of S-boxes is arranged in a symmetric n×n array configuration.

22. The system of claim 21, wherein n is an integer equal to 24.

23. The system of claim 2, wherein said data permutation circuit comprises a plurality of Benes-type non-blocking switching networks.

24. The system of claim 23, wherein each of said Benes networks comprises a plurality of individual permuter elements arranged in an n×n array, with each individual permuter element including an element select line.

25. The system of claim 24, wherein said data permutation circuit further comprises a second random number generation circuit including individual output lines, coupled to each of said individual permuter element select lines.

26. The system of claim 25, wherein said second random number generation circuit comprises:
an R-bit pseudo random number generator circuit; and
L number of JK-type flip-flops each coupled to receive two of the R-bits output by said R-bit random number generator portion.

27. The system of claim 26, wherein the two bits coupled to each of said JK flip-flops are non-adjacent bits.

28. The system of claim 26, further comprising:
a first variable frequency clock, coupled to a clock input port of said R-bit pseudo random number generator circuit, causing said R-bit pseudo random number generator circuit to operate at a first variable frequency magnitude; and
a second variable frequency clock, coupled to a clock input of each of said JK flip-flops, causing each of said JK flip-flops to operate at a second variable frequency magnitude.

29. The system of claim 28, wherein the first variable frequency magnitude is an odd multiple of the second variable frequency magnitude.

30. The system of claim 29, wherein the first variable frequency magnitude is approximately nine times the second variable frequency magnitude.

31. The system of claim 29, wherein the first variable frequency magnitude is a prime number.

32. The system of claim 31, wherein the prime number is greater than 80 MHz.

33. The system of claim 24, wherein said data permutation circuit further comprises:
a first crossbar switching circuit coupled between said data substitution circuit and said plurality of Benes networks; and
a second crossbar switching circuit coupled between said plurality of Benes networks and said data compression circuit.

34. The system of claim 33, wherein said first and second crossbar switching circuits each comprises a plurality of individual switch circuits that include (i) two inputs ports, (ii) two output ports, and (iii) a switch selection port.

35. The system of claim 34, wherein said data permutation circuit further comprises a second random number generation circuit including output lines individually coupled to (i) each of said individual permuter element select lines and (ii) each of said switch selection ports.

36. The system of claim 35, wherein said second random number generation circuit comprises:
an R-bit pseudo random number generator circuit; and
L number of JK-type flip-flops each coupled to receive two of the R-bits output by said R-bit random number generator portion.

37. The system of claim 36, wherein the two bits coupled to each of said JK flip-flops are non-adjacent bits.

38. The system of claim 36, further comprising a first variable frequency clock, coupled to a clock input port of said R-bit pseudo random number generator circuit, causing said R-bit pseudo random number generator circuit to operate at a first variable frequency; and
a second variable frequency clock, coupled to a clock input of each of said JK flip-flops, causing each of said JK flip-flops to operate at a second frequency.

39. The system of claim 38, wherein the first variable frequency magnitude is an odd multiple of the second variable frequency magnitude.

40. The system of claim 39, wherein the first variable frequency magnitude is approximately nine times the second variable frequency magnitude.

41. The system of claim 39, wherein the first variable frequency magnitude is a prime number.

42. The system of claim 41, wherein the prime number is greater than 80 MHz.

43. The system of claim 2, wherein said data compression circuit comprises a non-linear logic element (NLE).

44. The system of claim 43, wherein said NLE comprises:
a plurality of logic NAND gates, each of said logic NAND gates including (i) two inputs, each selectively coupled to receive a predetermined bit of the permuted and substituted random data, and (ii) an output; and
a logic exclusive-OR (XOR) tree circuit including (i) a plurality of inputs, select ones of which are coupled to each of said logic NAND gate outputs, and others of which are coupled to receive the permuted and substituted random data that is not selectively coupled to one of said plurality of logic NAND gates and (ii) at least two outputs each providing identical portions of the indeterminate random data string.

45. The system of claim 44, wherein the predetermined bits coupled to each of said logic NAND gate inputs are non-adjacent bits.

46. The system of claim 43, further comprising:
an M-bit sampling source selectively sampling the permuted and substituted random data output from said permutation circuit and transmitting the sampled data to said NLE.

47. The system of claim 46, wherein said M-bit sampling source comprises M number of JK-type flip-flops each coupled to receive two of the permuted and substituted random data bits output from said permutation circuit.

48. The system of claim 47, further comprising a third variable frequency clock, coupled to a clock input of each of said JK flip-flops, causing each of said JK flip-flops to operate at a third frequency.

49. The system of claim 43, wherein said NLE comprises:
a plurality of logic NAND gates, each of said logic NAND gates including (i) two inputs, each coupled to receive one bit of the permuted and substituted random data, and (ii) an output; and
a logic exclusive-OR (XOR) tree circuit including (i) a plurality of inputs individually coupled to each of said logic NAND gate outputs and (ii) at least two outputs each providing identical portions of the indeterminate random data string.

50. The system of claim 49, wherein the bits coupled to each of said logic WAND gate inputs are non-adjacent bits.

51. The system of claim 2, further comprising a plurality of N-bit serial registers each coupled to receive unique portions of the indeterminate random data string from said data compression circuit and output an N-bit indeterminate data string.

52. The system of claim 51, wherein N is an integer equal to 128.

53. The system of claim 51, further comprising:
a processor coupled to receive the N-bit indeterminate random data string from each of said plurality of N-bit serial registers.

54. The system of claim 53, wherein the processor performs functionality testing of the N-bit indeterminate random data string.

55. The system of claim 53, wherein the processor performs testing of the N-bit indeterminate data string in each of the N-bit serial registers to determine which of the plurality of N-bit serial registers outputs the N-bit indeterminate data string.

56. The system of claim 53, wherein the processor combines the N-bit indeterminate data string in each of the plurality of N-bit serial registers together and outputs the combination thereof.

57. A method of generating an indeterminate random data string, comprising:
generating a first random number of a first predetermined bit length;
substituting the first random number with different data based upon the first random number, wherein the first random number provides addresses to generate first and second random data segments which are concatenated to form substituted random data;
permuting the substituted random data to provide permuted data; and
compressing the permuted data to form at least a portion of the indeterminate random data string having reduced data length as compared to the permuted data.

58. A method of generating an indeterminate random data string, comprising:
generating a first random number of a first predetermined bit length by sampling an entropy source that varies in frequency and phase with a first sampling source that also varies in frequency and phase;
substituting the first random number with different data based upon the first random number;
permuting the substituted random data; and
compressing the permuted and substituted random data to form at least a portion of the indeterminate random data string.

59. The method of claim 58, further comprising:
permuting random data output from the entropy source prior to the random data being sampled by the sampling source.

60. The method of claim 58, wherein the substitution step comprises:
dividing the first random number into one or more random addresses of a predetermined bit length;
accessing predetermined substitution data based upon the one or more random addresses; and
concatenating the substitution data to form the substituted random data having the first predetermined bit length.

61. The method of claim 58, wherein the step of permuting the substituted random data comprises randomly permuting the substituted random data based on a generated second random number.

62. The method of claim 61, wherein the second random number is generated by sampling a second entropy source that varies in frequency and phase with a second sampling source that also varies in frequency in phase.

63. The method of claim 58, wherein the step of compressing the permuted and substituted random data comprises selectively performing logic NAND operations on predetermined pairs or bits of the permuted and substituted random data and performing a series of logic XOR operations on the logically NANDed data and the remaining bits of the permuted and substituted random data string not logically NANDed.

64. The method of claim 58, wherein the step of compressing the permuted and substituted random data comprises selectively performing logic NAND operations on the permuted and substituted random data that is sampled by the third sampling source and performing a series of logic XOR operations on the logically NANDed data.

65. The method of claim 58, further comprising the step of sampling the randomly permuted and substituted data with a third sampling source that varies in frequency and phase, prior to compressing the permuted and substituted random data.

66. The method of claim 65, wherein the step of compressing the permuted and substituted random data comprises selectively performing logic NAND operations on predetermined pairs of bits of the permuted and substituted random data and performing a series of logic XOR operations on the logically NANDed data and the remaining bits of the permuted and substituted random data string not logically NANDed.

67. The method of claim 65, wherein the step of compressing the permuted and substituted random data comprises selectively performing logic NAND operations on the permuted and substituted random data that is sampled by the third sampling source and performing a series of logic XOR operations on the logically NANDed data.

68. A system for generating an indeterminate random data string, comprising:
a first random number generation circuit comprising (i) an N-bit pseudo random number generator circuit and (ii) M number of JK-type flip-flops each coupled to receive two of the N-bits output by said N-bit pseudo random number generator circuit;
a data substitution circuit, including a plurality of substitution boxes (S-boxes) arranged in an n×n array configuration, coupled to receive random data output from said first random number generation circuit;
a data permutation circuit coupled to receive substituted random data output from said data substitution circuit, said data permutation circuit comprising a plurality of Benes-type non-blocking switching networks each formed from a plurality of individual permuter elements arranged in an n×n array, with each individual permuter element including an element select line;
a second random number generation circuit including output lines individually coupled to each of said individual permuter element select lines, said second random number generation circuit including (i) an R-bit pseudo random number generator circuit and (ii) L number of JK-type flip-flops each coupled to receive two of the R-bits output by said R-bit random number generator portion;
a data compression circuit coupled to receive permuted and substituted random data output from said permutation circuit and output at least a portion of the indeterminate random data string;
a first variable frequency clock, coupled to a clock input port of said N-bit pseudo random number generator circuit and said R-bit pseudo random number generation circuit, causing each to operate at a first variable frequency magnitude; and a second variable frequency clock, coupled to a clock input of each of said L and M number of JK flip-flops, causing each to operate at a second variable frequency magnitude.

69. The system of claim 68, further comprising:
an N-bit sampling source selectively sampling the permuted and substituted random data output from said permutation circuit and transmitting the sampled data to said data compression circuit, said M-bit sampling source including M number of JK-type flip-flops each coupled to receive two of the permuted and substituted random data bits output from said permutation circuit.

70. The system of claim 69, further comprising:
a third variable frequency clock, coupled to a clock input of each of said M number of JK flip-flops, causing each to operate at a third frequency.

71. The system of claim 68, wherein said data permutation circuit further comprises: an input crossbar switching circuit including a plurality of individual switching circuits having a plurality of input ports and output ports, and a switch selection port; and
an output crossbar switching circuit, having a plurality of input ports and output ports, and a switch selection port, coupled to an output portion of said plurality of Benes networks,
wherein said second random number generation circuit includes output lines individually coupled to each of said switch selection ports.

72. A method of generating an indeterminate random data string, comprising:
sampling an entropy source that varies in frequency and phase with a first sampling source that also varies in frequency and phase to generate a first random number of a first predetermined bit length;
substituting the first random number with different data based upon the first random number;
sampling a second entropy source that varies in frequency and phase with a second sampling source that also varies in frequency in phase to generate a second random number of a second predetermined bit length;
randomly permuting the substituted random data based on the generated second random number;
sampling the randomly permuted and substituted data with a third sampling source that varies in frequency and phrase, prior to compressing the permuted and substituted random data; and
compressing the permuted and substituted random data to form at least a portion of the indeterminate random data string.

73. The method of claim 72, further comprising:
permuting random data output from the entropy source prior to the random data being sampled by the sampling source.

74. The method of claim 72, wherein the substitution step comprises:
dividing the first random number into one or more random addresses of a predetermined bit length;
accessing predetermined substitution data based upon the one or more random addresses; and
concatenating the substitution data to form the substituted random data having the first predetermined bit length.

75. The method of claim 72, wherein the step of permuting the substituted random data comprises randomly permuting the substituted random data based on a generated second random number.

76. The method of claim 72, wherein the step of compressing the permuted and substituted random data comprises selectively performing logic NAND operations on predetermined pairs of bits of the permuted and substituted random data and performing a series of logic XOR operations on the logically NANDed data and the remaining bits of the permuted and substituted random data string not logically NANDed.

77. The method of claim 72, wherein the step of compressing the permuted and substituted random data comprises selectively performing logic NAND operations on the permuted and substituted random data that is sampled by the third sampling source and performing a series of logic XOR operations on the logically NANDed data.

78. A system for generating an indeterminate random data string, comprising:
a first random number generation circuit comprising (i) an N-bit pseudo random number generator circuit and (ii) M number of JK-type flip-flops each coupled to receive two of the N-bits output by said N-bit pseudo random number generator circuit;
a data substitution circuit, including a plurality of substitution boxes (S-boxes) arranged in an n×n array configuration, coupled to receive random data output from said first random number generation circuit;
a data permutation circuit coupled to receive substituted random data output from said data substitution circuit, said data permutation circuit comprising:
an input crossbar switching circuit including a plurality of individual switching circuits having a plurality of input ports and output ports, and a switch selection port;
a plurality of Benes-type non-blocking switching networks including an input portion coupled to said input crossbar switching circuit, each of said networks formed from a plurality of individual permuter elements arranged in an n×n array, with each individual permuter element including an element select line; and
an output crossbar switching circuit, having a plurality of input ports and output ports, and a switch selection port, coupled to an output portion of said plurality of Benes networks;
a second random number generation circuit including output lines individually coupled to (i) each of said individual permuter element select lines and (ii) each of said switch selection ports, said second random number generation circuit including (i) an R-bit pseudo random number generator circuit and (ii) L number of JK-type flip-flops each coupled to receive two of the R-bits output by said R-bit random number generator portion;
a data compression circuit coupled to receive permuted and substituted random data output from said permutation circuit and output at least a portion of the indeterminate random data string, said data compression circuit comprising:
a plurality of logic NAND gates, each of said logic NAND gates including (i) two inputs, each selectively coupled to receive a predetern1/2ined bit of the permuted and substituted random data, and (ii) an output; and
a logic exclusive-OR (XOR) tree circuit including (i) a plurality of inputs, select ones of which are coupled to each of said logic NAND gate outputs, and others of which are coupled to receive the permuted and substituted random data that is not selectively coupled to one of said plurality of logic NAND gates and (ii) at least two outputs each providing two different portions of the indeterminate random data string;

an M-bit sampling source selectively sampling the permuted and substituted random data output from said permutation circuit and transmitting the sampled data to said data compression circuit, said M-bit sampling source including M number of JK-type flip-flops each coupled to receive two of the permuted and substituted random data bits output from said permutation circuit;

a first variable frequency clock, coupled to a clock input port of said N-bit pseudo random number generator circuit and said R-bit pseudo random number generation circuit, causing each to operate at a first variable frequency magnitude;

a second variable frequency clock, coupled to a clock input of each of said L and M number of JK flip-flops, causing each to operate at a second variable frequency magnitude; and a third variable frequency clock, coupled to a clock input of each of said M number of JK flip-flops, causing each to operate at a third frequency.

79. A method of generating an indeterminate random data string, comprising:

sampling an entropy source that varies in frequency and phase with a first sampling source that also varies in frequency and phase to generate a first random number of a first predetermined bit length;

dividing the first random number into one or more random addresses of a predetermined bit length;

accessing predetermined substitution data based upon the one or more random addresses;

concatenating the substitution data to form the substituted random data having the first predetermined bit length;

sampling a second entropy source that varies in frequency and phase with a second sampling source that also varies in frequency in phase to generate a second random number of a second predetermined bit length;

randomly permuting the substituted random data based on the generated second random number;

sampling the randomly permuted and substituted data with a third sampling source that varies in frequency and phase, prior to compressing the permuted and substituted random data; and selectively performing logic NAND operations on predetermined pairs of bits of the permuted and substituted random data, and performing a series of logic XOR operations on the logically NANDed data and the remaining bits of the permuted and substituted random data string not logically NANDed, to compress the sampled data to form at least a portion of the indeterminate random data string.

* * * * *

UNITED STATES PATENT AND TRADEMARK OFFICE
CERTIFICATE OF CORRECTION

PATENT NO.     : 6,760,739 B2
DATED          : July 6, 2004
INVENTOR(S)    : Richard J. Takahashi It is certified that error appears in the above-identified patent and that said Letters Patent is hereby corrected as shown below:

Column 9,
Line 57, change "receive, random" to -- receive random --.

Column 12,
Line 62, change "WAND" to -- NAND --.

Column 15,
Line 6, change "N-bit" to -- M-bit --.

Column 16,
Line 60, change "predetern1/2ined" to -- predetermined --.

Signed and Sealed this

Twenty-sixth Day of October, 2004

JON W. DUDAS
*Director of the United States Patent and Trademark Office*